Patented Oct. 6, 1936

2,056,548

UNITED STATES PATENT OFFICE 2,056,548

ANTHRAPYRIMIDONE SULPHONIC ACIDS AND PROCESS OF PREPARING THE SAME

Klaus Weinand, Leverkusen-I. G. Werk, Germany, assignor to General Aniline Works, Inc., New York, N. Y., a corporation of Delaware No Drawing. Application November 11, 1932, Serial No. 642,328. In Germany November 19, 1931

8 Claims. (Cl. 260—32)

The present invention relates to a process of preparing anthrapyrimidone sulphonic acids and to the new products obtainable by said process.

In accordance with the invention anthrapyrimidone sulphonic acids are obtainable in a good yield and in a convenient manner, by reacting with an amide of carbonic acid, such as urethanes (methyl- or ethylurethane, for example), urea, monoalkylureas, etc., upon a compound of the probable formula:—

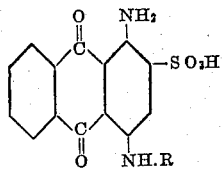

wherein R means an alkyl group, such as a methyl-, ethyl-, propyl-, isopropyl-, butyl group, or an aryl-, aralkyl- or hydroaryl group. All the nuclei of these compounds may be substituted by monovalent substituents. Such, for example, anthraquinone derivatives may be applied as starting materials being substituted in the anthraquinone nucleus by halogen atoms (chlorine or bromine, for example), alkyl groups ($CH_3$, $C_2H_5$, etc.), hydroxy groups, alkoxy groups, carboxylic acid groups, sulphonic acid groups, etc. Likewise the group R may be substituted in the most various manner, for example, by the substituents outlined above or by amino-, acetamino-, carboxylic acid amide- or -ester groups, thioether groups, etc.

The reaction is performed while heating the reaction components, advantageously to a temperature of between about 150–200° C. in the presence or absence of a suitable solvent. I prefer to apply solvents being capable of dissolving both the starting materials. The best results are generally obtained by the use of a phenol as the solvent.

In many cases it is advantageous to add to the reaction mixture a salt possessing a condensing action and being indifferent to the amides of carbonic acid under the conditions of working, such as ammonium chloride, sodium acetate, sodium- or potassium carbonate, calcium chloride, zinc chloride, etc. The addition of these salts is, however, not necessary, but tends to accelerate the reaction.

When working in the manner described, there are obtained in a convenient manner and in a good yield anthrapyrimidone sulphonic acids, which most probably correspond in their free form to the general formula:—

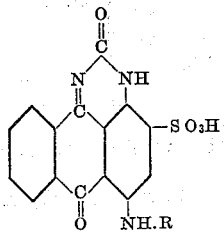

wherein R means an alkyl-, aryl-, aralykl- or hydroaryl group, and in which all the nuclei may be further substituted by monovalent substituents. The compounds in question form red to blue crystals, dissolving in water with the same coloration, in concentrated sulphuric acid with a yellow to red coloration. They dye wool from an acid bath clear and even red to violet shades of good fastness properties.

The following examples illustrate the invention, without restricting it thereto, the parts being by weight:—

Example 1

20 parts of 1-amino-4-methylamino-anthraquinone-2-sulphonic acid are boiled in 100 parts of methyl-urethane or ethyl urethane, until the blue coloration of the solution changes to violet. The 4-methylamino-1.9-anthrapyrimidone-2-sulphonic acid separates while still hot in blue needles, dyeing wool from an acid bath reddish-violet.

When the 1-amino-4-methylamino-anthraquinone-2-sulphonic acid is replaced by 1-amino-4-hexahydroanilidoanthraquinone-2-sulphonic acid the 4-hexahydroanilido-1.9-anthrapyrimidone-2-sulphonic acid is obtained, which dyes wool a similar shade.

Example 2

20 parts of 1-amino-4-anilido-anthraquinone-2-sulphonic acid, 10 parts of urea or monomethylurea and 10 parts of ammonium chloride are heated to 180° C. in 150 parts of phenol. After about 3 hours the melt is cooled and stirred into 150 parts of 30° Bé. caustic soda solution, whereupon the anthrapyrimidone - sulphonic acid formed separates in a crystalline form. It dyes wool from an acid bath violet shades.

Similar dyestuffs are obtained by using as starting materials
1-amino-4-meta-chloro-anilidoanthraquinone-2-sulphonic acid,
1-amino-4-para-acetylamino-anilido-anthraquinone-2-sulphonic acid, 1-amino-4-anilido-6-chloroanthraquinone-2-sulphonic acid (obtainable from 1-amino-2.4-dibromo-6-chloroanthraquinone by condensation with aniline and treating the resulting 1-amino-2-bromo-4-anilido-6-chloroanthraquinone with sodium sulphite in the customary manner), 1-amino-4-anilidoanthraquinone-2.5-disulphonic acid, 1-amino-4-tetrahydronaphthylamino-anthraquinone-2-sulphonic acid, 1-amino-4-benzylaminoanthraquinone-2-sulphonic acid, and causing these substances to react with amides of carbonic acid by the method described above.

I claim:—

1. The product having in its free form the formula:

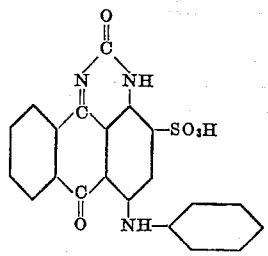

said product dyeing wool from an acid bath violet shades.

2. The product having in its free form the formula:—

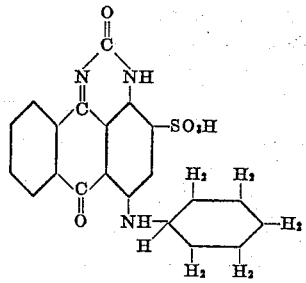

said product dyeing wool from an acid bath reddish-violet shades.

3. The product having in its free form the formula:—

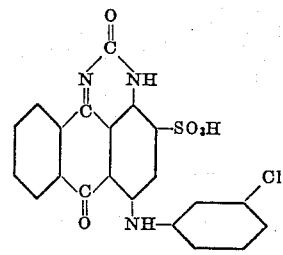

said product dyeing wool from an acid bath reddish-violet shades.

4. The process of preparing anthrapyrimidone sulphonic acids which comprises heating a carbonic acid amide with an 1.4-diamino-anthraquinone-2-sulphonic acid, the 4-amino group of which has one hydrogen atom replaced by a radical selected from the group consisting of alkyl-, phenyl-, chloro-phenyl-, acetyl-aminophenyl-, benzyl-, hydrophenyl- and hydronaphthyl groups.

5. The process of preparing anthrapyrimidone sulphonic acids which comprises heating to a temperature of between about 150° and about 200° C. a carbonic acid amide with an 1.4-diamino-anthraquinone-2-sulphonic acid, the 4-amino group of which has one hydrogen atom replaced by a radical selected from the group consisting of alkyl-, phenyl-, chloro-phenyl-, acetyl-aminophenyl-, benzyl-, hydrophenyl- and hydronaphthyl groups.

6. The process of preparing anthrapyrimidone sulphonic acids which comprises heating to a temperature of between about 150° and about 200° C. a carbonic acid amide with an 1.4-diamino-anthraquinone-2-sulphonic acid, the 4-amino group of which has one hydrogen atom replaced by a radical selected from the group consisting of alkyl-, phenyl-, chloro-phenyl-, acetyl-amino-phenyl-, benzyl-, hydrophenyl- and hydronaphthyl groups, in the presence of a solvent which is inert to the carbonic acid amide and which is capable of dissolving both starting materials, and in the presence of a salt possessing a condensing action and being indifferent to the carbonic acid amide.

7. The process of preparing anthrapyrimidone sulphonic acids which comprises heating to a temperature of between about 150° and about 200° C. a carbonic acid amide with an 1.4-diamino-anthraquinone-2-sulphonic acid, the 4-amino group of which has one hydrogen atom replaced by a radical selected from the group consisting of alkyl-, phenyl-, chloro-phenyl-, acetyl-amino-phenyl-, benzyl-, hydrophenyl- and hydronaphthyl groups, in the presence of phenol, and in the presence of a salt possessing a condensing action and being indifferent to the carbonic acid amide.

8. Anthrapyrimidone-2-sulphonic acids which have one hydrogen atom of an amino group in the 4-position of the anthraquinone nucleus replaced by a radical selected from the group consisting of alkyl-, phenyl-, chloro-phenyl-, acetyl-amino-phenyl-, benzyl-, hydrophenyl- and hydronaphthyl groups.

KLAUS WEINAND.